June 25, 1963
W. VANGOR
3,094,781
COURSE FINDER
Filed March 10, 1960
2 Sheets-Sheet 1
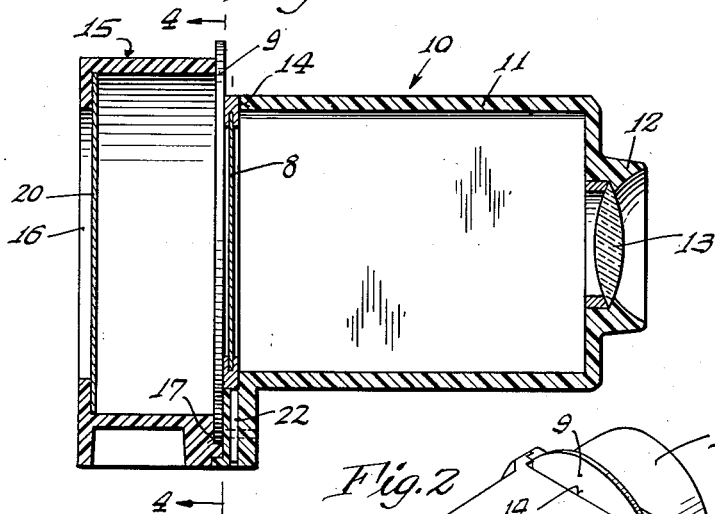
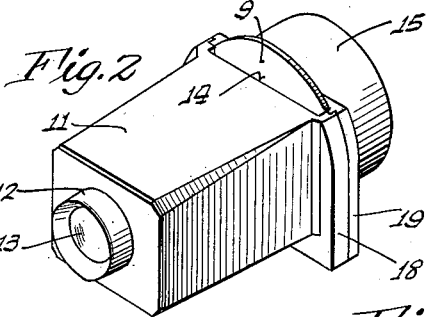
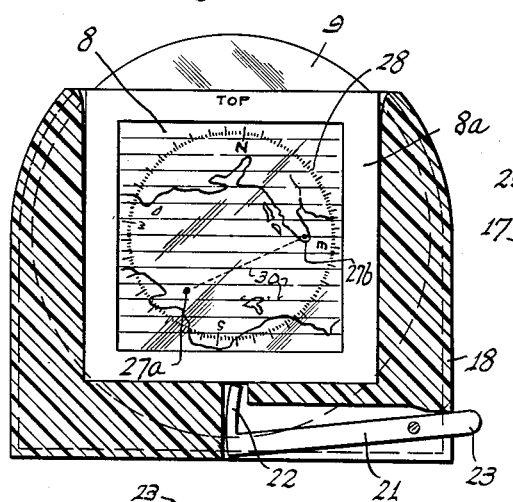
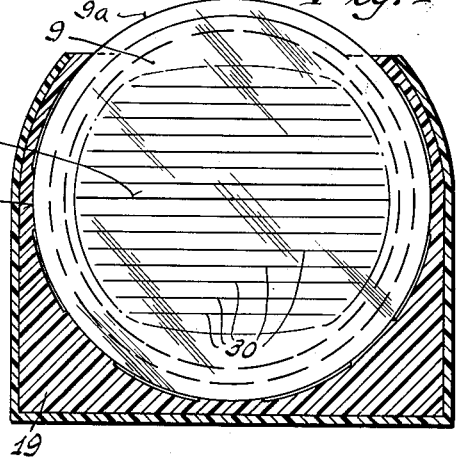
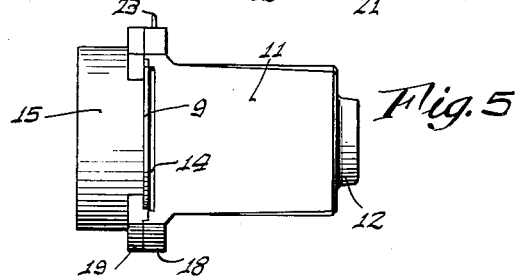
INVENTOR.
William Vangor
BY
Johnson and Kline
ATTORNEYS June 25, 1963 W. VANGOR 3,094,781
COURSE FINDER
Filed March 10, 1960 2 Sheets-Sheet 2
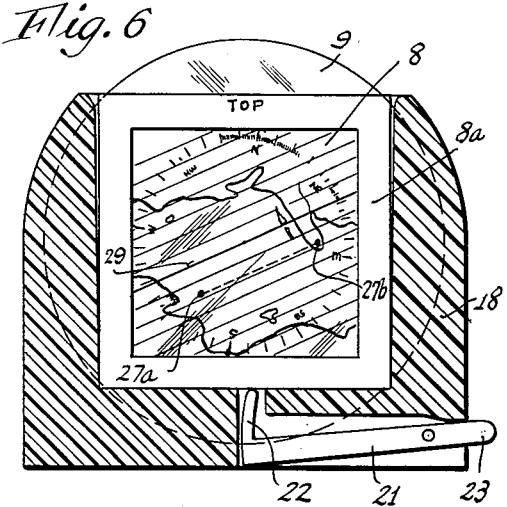
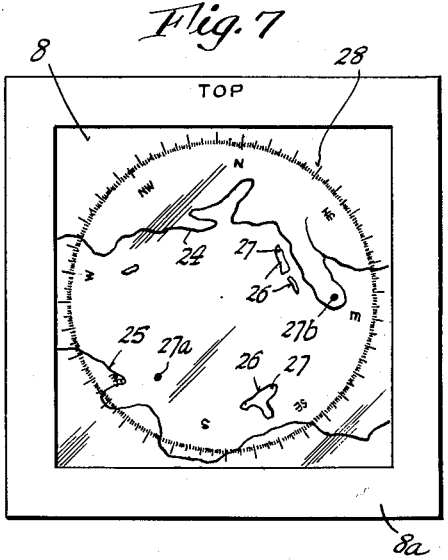
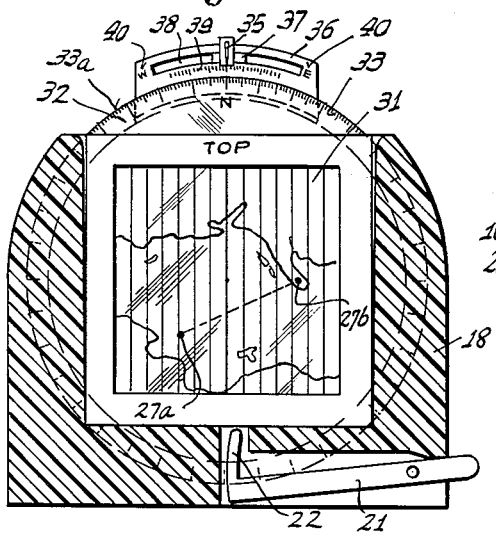
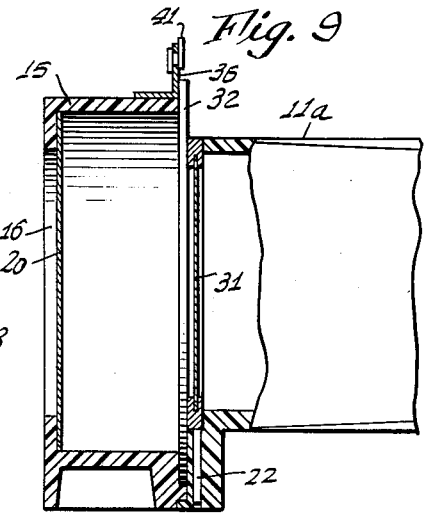
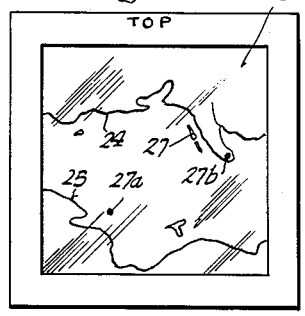
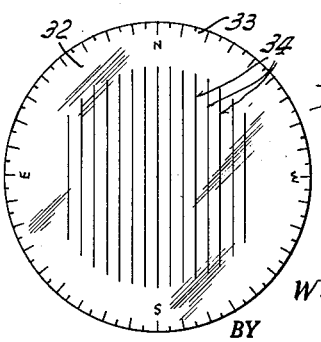
INVENTOR.
William Vangor
BY
Johnson and Kline
ATTORNEYS

United States Patent Office 3,094,781
Patented June 25, 1963

3,094,781
COURSE FINDER
William Vangor, 325 High Ridge Road, Fairfield, Conn.
Filed Mar. 10, 1960, Ser. No. 14,129
3 Claims. (Cl. 33—1)

This invention relates to means for finding the course between two points on a marine chart or the like.

One of the objects of this invention is to provide means for finding such a course without the necessity of using a protractor or parallel rulers and without requiring working with large cumbersome charts or large scale enlargements thereof.

Another object of this invention is to permit the course between two selected points to be easily and quickly found and to do this in the darkness as well as in the light.

A further object is to provide a course finding system which is particularly adapted for use on smaller pleasure boats which lack the storage space, working space and facilities required for the use of the usual charts such as those now used on larger boats and yachts.

By the use of the present invention, the smaller pleasure boats may conveniently carry and use charts collectively covering a large area and thus be better informed to avoid shoals and other hazards when proceeding beyond the usual local area of action whereby their use will promote safety in small boat handling.

These and other objects are accomplished, according to the present invention, by making reductions of maps and charts or sections thereof to relatively small scale in the form of transparencies which can be seen optically enlarged in a hand-held viewing device, and providing another transparency which, when superposed with the chart-carrying transparency and rotated to bring the spaced parallel lines into parallelism or alignment with a real or imaginary line extending between selected points on the chart, may be used to indicate the direction of the course to be found by reference to an incorporated compass rose provided for the purpose.

In one form of the invention, that at present preferred, the compass rose is displayed on the chart-carrying transparency and circumscribes the latter, and an arrow or other indication on the transparency carrying the parallel lines cooperates with the compass rose to indicate the course in degrees or points of the compass to be followed to make good a passage from one point to another. The compass rose preferably is oriented with respect to the chart so as to show "magnetic" bearings in the particular area covered by the chart.

In another form of the invention, the compass rose is carried by the transparency displaying the parallel lines, and this cooperates with a non-rotating pointer which is adjustable from a position showing "true" bearings to positions either side of the latter to indicate "magnetic" bearings to compensate for variations at the particular area covered by the chart. To facilitate this adjustment, a scale is provided, reading in degrees, for east and west variations.

In practicing the present invention, the transparencies may be photographic reductions of maps or charts or sections thereof on film, and in most cases these will be provided in sets or series of adjoining sections of a large area so that the chart transparencies, being removably and interchangeably supported by the viewing device, can be used in succession to cover a long trip or voyage. In this way, individual chart transparencies can be made in greater detail with regard to topography of the land areas and depths of the water areas.

Other features and advantages will hereinafter appear.

In the accompanying drawings which illustrate several forms of this invention:

FIGURE 1 is a longitudinal section of a viewing device which is suitable for use in the present invention.

FIG. 2 is a perspective view of the viewing device shown in FIG. 1.

FIG. 3 is a transverse section of the device showing the chart transparency and the transparency displaying the parallel lines in superposed position.

FIG. 4 is a transverse section taken on the line 4—4 of FIG. 1, and showing the transparency carrying the parallel lines and the manner in which it is mounted in the viewing device.

FIG. 5 is a top plan of the device as shown in FIG. 2.

FIG. 6 is a view similar to FIG. 3, showing the course-indicating transparency adjusted to indicate the course between two designated points.

FIG. 7 shows the chart-carrying transparency on an enlarged scale.

FIG. 8 is a transverse section of a modified form of this invention in which the compass rose is carried by the course-indicating transparency.

FIG. 9 is a longitudinal section of a viewing device for the transparencies illustrated in FIG. 8.

FIG. 10 is a view of the chart transparency used in the form of the invention shown in FIGS. 8 and 9.

FIG. 11 is a face view of the course finder used in the form of the invention illustrated in FIG. 8.

Referring now to the form of the invention illustrated in FIGS. 1 to 7, FIG. 7 illustrates a chart transparency 8 which is rectilinear and FIG. 4 illustrates the course-indicating transparency 9 which is circular. The viewing device 10 has a casing 11, an eyepiece 12, and an enlarging lens 13. The casing 11 has a vertical slot 14 open at the top to receive the transparency 8 and has a rear portion 15 which has an opening 16 to admit light whereby the transparency may be viewed.

The rear portion 15 is provided with a circular recess 17 to receive the transparency 9 which is rotatable in the recess 17. So that the transparency 9 can be manipulated, it or its frame 9a projects above the upper portion of the rear portion 15 as shown. The casing 11 and the rear portion 15 are conveniently formed of separate pieces so that after the rotatable transparency 9 is placed in the recess 17, laterally projecting flanges 18 and 19 on the parts 11 and 15 on the casing may be secured together by cementing or otherwise, thus retaining the transparency 9 against removal. As thus assembled, the chart transparency 8 is located in front of the course-indicating transparency 9 but closely adjacent to it so that when the transparency 8 is in position, light entering the rear portion 15 through the opening 16 and passing through a diffusing plate 20 will illuminate the indicia on the transparencies.

To facilitate removal of a chart transparency 8 so that it may be replaced by another, an ejector lever 21 may be provided having one end 22 engaging the lower edge of the transparency and a projecting fingerpiece 23 by means of which it is operated to raise the transparency 8 through the open end of the slot 14 where it can be grasped by hand.

Referring to FIG. 7, it will be noted that the transparency 8 displays a section of a marine chart showing lines 24 and 25 indicating the coast line and outlines 26 indicating islands and points 27, 27a and 27b indicating locations such as those of lighthouses, buoys, etc. which serve as guides in piloting a boat or other vessel along a desired course. The transparency 8 also displays a compass rose 28 circumscribing the chart and having its axis at the geometrical center thereof.

The compass rose may be divided into degrees or compass points or both as desired and it may be oriented relative to the subject matter shown on the chart to either the "true" or "magnetic" north poles.

As shown in FIG. 7, the compass rose is oriented according to the variation at the area covered by the chart which is about 8° west so that, neglecting deviation, a magnetic compass course can be read from the rose. The compass rose is so positioned within the frame 8a of the transparency 8 that it may be seen at all times.

Referring to FIG. 4, the transparency 9 is provided with a diametrical line 29 and a plurality of spaced parallel lines 30 on each side of and parallel to the line 29. The lines 29 and 30 are contained within the frame 9a of the transparency 9 and may be seen at all times.

When it is desired to find a course from one location point to another, the user selects a transparency 8 showing the area to be traveled and places it in the slot 14 of the viewing device where it becomes displayed in superposed relation with the course-finding lines 29 and 30. The user then rotates the transparency 9 until one of the parallel lines either aligns with or is parallel to a real or imaginary line extending between points selected. As an example, the user having decided to travel from point 27a to point 27b on the chart as shown in FIG. 7, the finder 9 is rotated to the position shown in FIG. 6 where one of the parallel lines 30 will be parallel to a line between the points 27a and 27b. In this position, the diametrical line 29 crosses the compass rose at a point which is about 58° east of north and this would indicate the magnetic compass bearing between the points 27a and 27b, subject to correction for deviation if necessary. If the course were to be from the point 27b to the point 27a, the other end of the diametrical line would indicate a westerly course of 238°. If the course to be made were between any two other points on the chart, the same procedure would be followed of bringing the parallel lines 30 parallel to a line extending between the selected points and then reading along the compass rose from the diametrical line or indicator 29. Should the user desire to go beyond the point 27b, he would select the next transparency 8 of the series and continue to chart his course as explained above.

In the form of the invention illustrated in FIGS. 8, 9 and 10, the chart is indicated on the transparency 31 which may be like the transparency 8 shown in FIG. 7 except that the transparency 31 does not contain a compass rose. The course-finding transparency 32 may be like that shown in FIG. 4 except that it does carry a compass rose 33 on its frame 33a which projects beyond the casing 11a of the viewing device where it can be observed by the user.

The course-finding transparency 32 is rotatable in the casing 11a relative to the transparency 31 like that shown in FIG. 4 so that the parallel lines 34 may be brought into alignment or parallel with a real or imaginary line between points such as the points 27, 27a and 27b on the chart transparency 31.

Cooperating with the compass rose 33 is a normally stationary pointer 35 which is carried by a plate 36 forming part of or attached to the casing 11a. The pointer 35 is carried by a slide 37 mounted in an arcuate slot 38 in the plate 36, the center of which is coincident with the axis of rotation of the course-finding transparency 32. The arcuate slot extends a number of degrees each side to a line perpendicular to the axis of the course-finding transparency so that the slide and pointer may be moved in either clockwise or counterclockwise direction a number of degrees corresponding to the variation at the locale of the chart shown on the transparency 31, the plate 36 having a scale 39 and direction indications 40. The slide 37 has a fingerpiece 41 to facilitate adjustment and has a frictional fit in the slot 38 to hold it against casual displacement.

The chart being oriented to true north as is usual, the user will set the pointer 35 against the scale 39 according to the variation, be it east or west, at the locale of the chart which he has inserted in the viewer.

In using the course finder shown in FIGS. 8, 9 and 10 when the course to be followed has been determined and the course-finding transparency 32 has been rotated to bring a line 34 aligned with or parallel to the course, the pointer 35 will indicate on the rose 33 the magnetic compass bearing between the two points, for instance the points 27a and 27b. The compass rose 33 has its north point located on an extension of a line which is diametrical of the circular course-finding transparency 32. The chart transparencies 31 are inserted in the viewer 11a in the same manner that the chart transparencies 8 are inserted in the viewer 11.

If the compass rose has been adjusted for deviation, the bearing indicated will be the course to be taken by the boat. Of course, the operator of the boat will also have to bear in mind the time required to travel between two points and any currents that may be present in the waters being traveled.

The viewing device and the transparencies being relatively small can be easily stowed on a small boat and can be used with convenience, since it is not necessary to have a table on which to rest the chart and a protractor or parallel rulers in order to determine a course between two points.

The invention is particularly advantageous when traveling at night, because the chart can be observed and a course found without providing any general illumination which would tend to blind the pilot, since it is merely necessary to hold the viewing device near a binnacle light or other dim light or to apply a small flashlight to the open rear portion 15 of the device. Of course, if desired, the portion 15 may be provided with a small battery-operated light such as many viewing devices contain.

Variations and modifications may be made within the scope of the claims and portions of the improvements may be used without others.

I claim:

1. A course finder comprising a first transparency displaying geographical subject matter including indicia denoting location points and comprising a photographic film supported in a frame; a second transparency having indicia consisting of a plurality of spaced parallel lines; means for holding said transparencies in superposed position for simultaneous viewing by light transmitted through the transparencies, said means providing for the rotation of one of said transparencies through an arc of at least 180° relative to the other about an axis common to the planes of the transparencies and substantially at the geometrical center of the other transparency and for holding said first transparency for removal and replacement by hand; means including a compass rose and cooperating pointer for indicating the direction of a course to be found when said parallel lines align with or parallel an imaginary line extending between two location points on said subject matter, said holding means having means for causing diffused light to pass through said superposed transparencies to a sight opening; and a lens in said sight opening to magnify the indicia on the transparencies.

2. A course finder comprising a holder of such weight and dimension as to be conveniently held in one hand, said holder comprising a casing having a viewing aperture at one end and a light transmitting tunnel leading to said aperture and a light diffusing element at the other end of said tunnel; means for forming a first cavity in said casing having an opening at the top of the casing to receive through said opening and removably hold a non-circular framed transparency containing indicia in predetermined orientation transversely of said tunnel; and means for forming a second cavity in said casing; a circular indicia-containing transparency displaying parallel lines rotatably mounted in said second cavity in parallel juxtaposition to a transparency in said first cavity, said means for forming said second cavity comprising means for confining against removal said circular transparency in said second cavity and positioning said circular transparency for access by finger engagement external of said casing, whereby the circular transparency may be rotated by hand relative to said non-circular transparency.

3. A course finder comprising a holder of such weight and dimension as to be conveniently held in one hand, said holder comprising a casing having a viewing aperture at one end and a light transmitting tunnel leading to said aperture; means for forming in said casing a first cavity having an opening at the top of the casing; a non-circular framed transparency displaying geographical indicia removably mounted in said first cavity in predetermined orientation transversely of said tunnel; means for forming a second cavity in said casing; and a circular indicia-containing transparency displaying parallel lines rotatably mounted in said second cavity in parallel juxtaposition to a transparency in said first cavity, said means for forming said second cavity positioning said circular transparency for access by finger engagement external of said casing, whereby the circular transparency may be rotated by hand relative to said non-circular transparency.

References Cited in the file of this patent
UNITED STATES PATENTS

| | | |
|---|---|---|
| 1,311,641 | Christensen | July 29, 1919 |
| 1,625,369 | Loth | Apr. 19, 1927 |
| 2,007,986 | Sprague | July 16, 1935 |
| 2,114,652 | Dalton | Apr. 19, 1938 |
| 2,210,773 | Niemeyer | Aug. 6, 1940 |
| 2,630,631 | McMullen | Mar. 10, 1953 |
| 2,637,848 | Cunningham | May 5, 1953 |
| 2,737,741 | Rice | Mar. 13, 1956 |
| 2,948,975 | Fowle | Aug. 16, 1960 |